United States Patent
Patocka

(10) Patent No.: US 9,952,984 B2
(45) Date of Patent: *Apr. 24, 2018

(54) ERASING A STORAGE BLOCK BEFORE WRITING PARTIAL DATA

(71) Applicant: Red Hat, Inc., Raleigh, NC (US)

(72) Inventor: Mikulas Patocka, Prague (CZ)

(73) Assignee: Red Hat, Inc., Raleigh, NC (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/158,964

(22) Filed: May 19, 2016

(65) Prior Publication Data

US 2016/0267021 A1    Sep. 15, 2016

Related U.S. Application Data

(63) Continuation of application No. 13/479,366, filed on May 24, 2012, now Pat. No. 9,348,769.

(51) Int. Cl.
*G06F 12/02* (2006.01)
*G06F 12/14* (2006.01)
*G06F 12/08* (2016.01)

(52) U.S. Cl.
CPC .......... *G06F 12/145* (2013.01); *G06F 12/023* (2013.01); *G06F 12/0238* (2013.01); *G06F 12/08* (2013.01); *G06F 12/1416* (2013.01); *G06F 12/1425* (2013.01); *G06F 2212/1052* (2013.01); *G06F 2212/151* (2013.01); *G06F 2212/152* (2013.01); *G06F 2212/154* (2013.01); *G06F 2212/657* (2013.01)

(58) Field of Classification Search
CPC .............. G06F 12/023; G06F 12/0238; G06F 12/1416; G06F 12/1425; G06F 12/145
See application file for complete search history.

(56) References Cited

U.S. PATENT DOCUMENTS

| | | | |
|---|---|---|---|
| 6,032,235 | A | 2/2000 | Hoge |
| 7,698,334 | B2 | 4/2010 | Kazar et al. |
| 2004/0221125 | A1 | 11/2004 | Ananthanarayanan et al. |
| 2005/0066095 | A1 | 3/2005 | Mullick et al. |
| 2008/0235479 | A1 | 9/2008 | Scales et al. |
| 2009/0049265 | A1 | 2/2009 | Candelaria et al. |
| 2009/0182785 | A1 | 7/2009 | Aston et al. |
| 2009/0307423 | A1 | 12/2009 | Galloway et al. |
| 2011/0029728 | A1 | 2/2011 | Popvski et al. |
| 2012/0042141 | A1 | 2/2012 | Tatara et al. |

(Continued)

OTHER PUBLICATIONS

USPTO Non-Final Office Action for U.S. Appl. No. 13/479,366 dated Jan. 8, 2014.

(Continued)

*Primary Examiner* — Hal Schnee
(74) *Attorney, Agent, or Firm* — Lowenstein Sandler LLP

(57) ABSTRACT

A mechanism for managing storage block of a data volume is disclosed. A method includes determining, by a processing device, whether a current data is to be written into an entirety of a storage block of a data volume of an operating system. The method also includes deleting, by the processing device, all of previously written data on the storage block before writing the current data into the storage block in response to determining that the current data is not to be written into the entirety of the storage block. The current data is different from the previously written data.

20 Claims, 6 Drawing Sheets

(56) References Cited

U.S. PATENT DOCUMENTS

2013/0254500 A1  9/2013  Nakajima et al.

OTHER PUBLICATIONS

USPTO Final Office Action for U.S. Appl. No. 13/479,366 dated Apr. 24, 2014.
USPTO Advisory Action for U.S. Appl. No. 13/479,366 dated Jul. 7, 2014.
USPTO Non-Final Office Action for U.S. Appl. No. 13/479,366 dated Aug. 5, 2014.
USPTO Final Office Action for U.S. Appl. No. 13/479,366 dated Nov. 18, 2014.
USPTO Advisory Action for U.S. Appl. No. 13/479,366 dated Jan. 26, 2015.
USPTO Non-Final Office Action for U.S. Appl. No. 13/479,366 dated Mar. 2, 5015.
USPTO Final Office Action for U.S. Appl. No. 13/479,366 dated Jun. 5, 2015.
USPTO Advisory Action for U.S. Appl. No. 13/479,366 dated Aug. 17, 2015.
USPTO Non-Final Office Action for U.S. Appl. No. 13/479,366 dated Oct. 6, 2015.
USPTO Notice of Allowance and Fee(s) Due for U.S. Appl. No. 13/479,366 dated May 2, 2016.

ERASING A STORAGE BLOCK BEFORE WRITING PARTIAL DATA

CROSS-REFERENCE TO RELATED APPLICATIONS

This application is a continuation of U.S. patent application Ser. No. 13/479,366, filed May 24, 2012, and hereby incorporated by reference.

TECHNICAL FIELD

The embodiments of the invention relate generally to storage area networks and, more specifically, relate to a mechanism for managing storage block of a data volume.

BACKGROUND

Data centers are usually composed of various Internet Small Computer System Interface (iSCSI) and FibreChannel storage devices, and also even direct attached storage, such as a disk. Such storage devices are commonly known as physical volumes. All of this storage may be from different manufacturers and contain un-initialized data that was previously used by some machines. The physical volumes are generally combined into a volume group, which creates a pool of space out of, which LVs (LVs) are allocated. As such, the LVs also contain the un-initialized data, which is accessible to other machines, resulting in a security risk. As a result, it is necessary to erase the data in the LV in order to prevent access to the data by other machines.

One current technique for erasing un-initialized data on LVs is to overwrite each LV with zeros. LVs may be copied to new LVs or to existing LVs, which are then overwritten with zeros, effectively erasing all the data. However, this technique can take a long time depending on the amount of data stored on the LV.

Another technique for erasing un-initialized data on the LV is to use a sparse file or a snapshot of a virtual machine image. When a LV is created, a specific number of logical blocks are assigned to the LV. A table in the LV maps each of the logical blocks into physical blocks so that when a customer writes into the logical blocks, each of the logical blocks are allocated to the physical volume at a specific location. However, the logical blocks are not contiguously allocated, and reading such non-contiguous physical blocks is a slow process as the system needs to seek to a different location with each block read.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
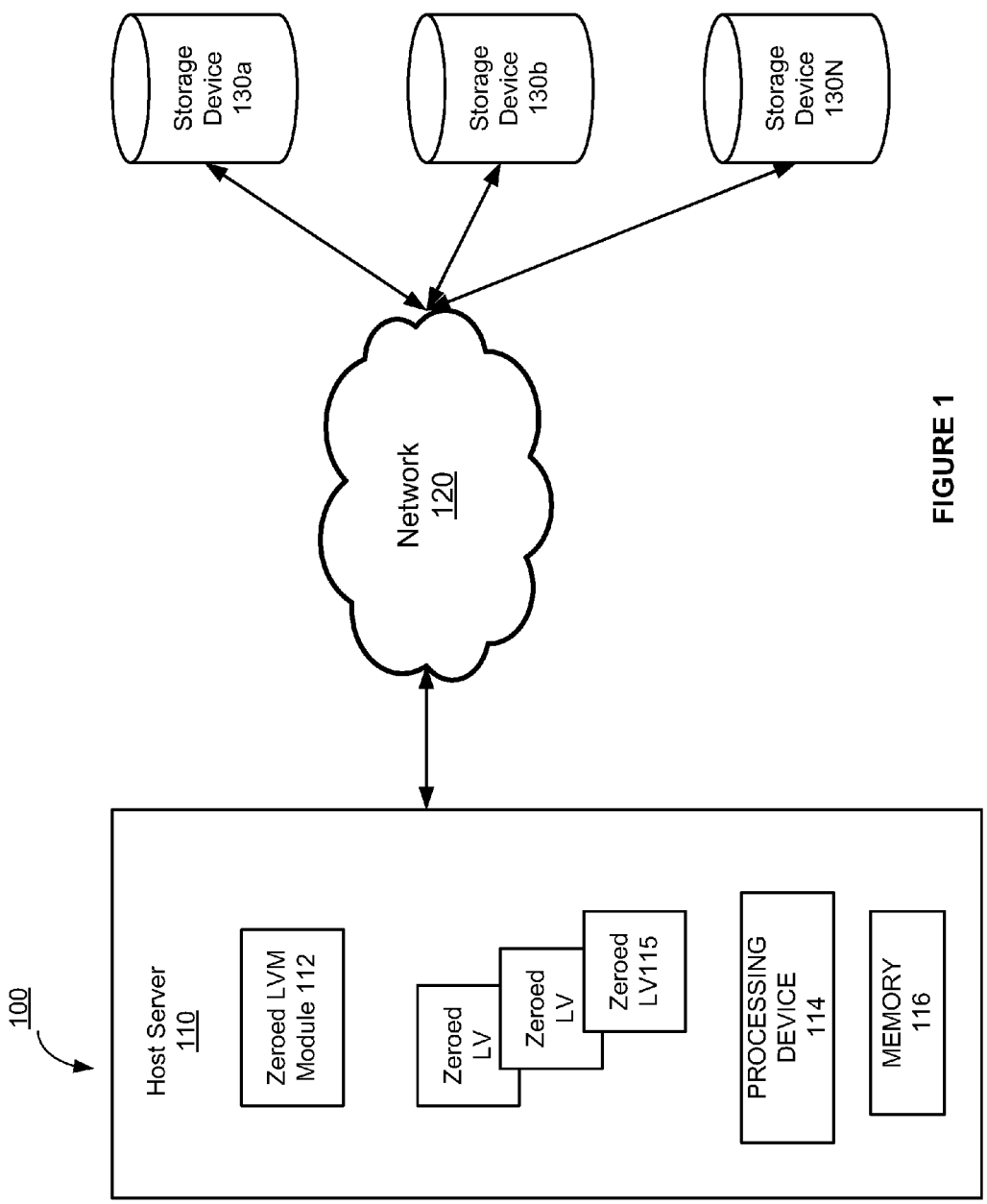
FIG. 1 is a block diagram of a zeroed LV system according to an embodiment of the invention.

Embodiments of the invention provide for a mechanism for managing storage block of a data volume.

According to one embodiment of the present invention, the method includes assigning, by a computing device, a bit value to each of storage blocks in a data volume of an operating system. The method also includes permitting, by the computing device, data in the storage blocks of the data volume to be read if the bit is set with the value 1. The method further includes preventing, by the computing device, the data in the storage blocks of the data volume to be read if the bit is set with the value 0.

According to another embodiment of the present invention, the method includes assigning, by a zeroed LV module of a computing device, a bit value to each of storage blocks in a data volume of a virtual machine (VM) of the computing device. The method also includes permitting, by the zeroed LV module, data in the storage blocks of the data volume to be read if the bit is set with the value 1. The method further includes preventing, by the zeroed LV module, the data in the storage blocks of the data volume to be read if the bit is set with the value 0.

In the following description, numerous details are set forth. It will be apparent, however, to one skilled in the art that the present invention may be practiced without these specific details. In some instances, well-known structures and devices are shown in block diagram form, rather than in detail, in order to avoid obscuring the present invention.

Some portions of the detailed descriptions, which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "assigning", "permitting", "allowing", "preventing", "deleting", "retrieving", "storing" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention disclose systems and methods for managing zeroed LV. In one embodiment, a zeroed LV module is initialized on a host operation system. The zeroed LV module assigns a bit value to each of storage blocks in a data volume of the host operating system. The zeroed LV functions to permit data on the storage blocks of the data volume to be read if the bit is set with the value 1. The zeroed LV functions to prevent data in the storage blocks of the data volume to be read if the bit is set with the value 0.

In another embodiment, a zeroed LV module is initialized on a virtual machine (VM) of a computing device. The zeroed LV module assigns a bit value to each of storage blocks in a data volume of the VM of the computing device. The zeroed LV functions to permit data in the storage blocks of the data volume to be read if the bit is set with the value 1. The zeroed LV functions to prevent data in the storage blocks of the data volume to be read if the bit is set with the value 0.

FIG. 1 is a block diagram of a zeroed LV system 100 according to an embodiment of the invention. Zeroed LV system 100 includes a host server 110 connected to one or more storage devices 130a-N via network 120. The network 100 may be a private network (e.g., a local area network (LAN), wide area network (WAN), intranet, etc.), public network (e.g., the Internet), or a combination thereof. In one embodiment, storage devices 130a-130N are fragmented storage devices, such as iSCSI, FibreChannel, and/or any other type of network block devices, implemented as a data center.

In one embodiment, the host server 110 is a computing device with a hardware platform including at least a processing device 114 and a memory 116. The host server 110 executes one or more zeroed Logical Volumes LVs 115 on top of a software layer running directly on the hardware platform of the host server 110. An LV is a storage medium that allocates storage space associated with a logical disk. It includes an area of physical and logical disk space that is used by applications, such as a database, to read or write characters directly to the LV.

In one embodiment, the host server 110 includes a zeroed logical volume management (LVM) module 112 to connect the fragmented storage devices 130a-N as a storage pool that is then attached to the zeroed LVs 115 by host server 110. In one embodiment, the zeroed LVM module 112 is a mix of management application and libraries that provide the functionality for embodiments of the invention.

In one embodiment, the zeroed LVM module 112 connects fragmented storage devices 130a-N by first identifying all network-capable storage devices 130a-130N via network 120 and storing their information into its memory. The zeroed LVM module 112 also writes information, such as a metadata describing a mapping of storage blocks of the physical storage devices 130a-130N to specific zeroed LVs 115 hosted by the host server 110.

In one embodiment, the host server 110 allocates the one or more zeroed LVs 115. This allocation occurs before the zeroed LVs 115 are initialized by an end user (not shown) of the LV 115. Specifically, the zeroed LVM module 112 allocates a certain block size from the storage space on the fragmented storage devices 130a-N and assigns it to one of the zeroed LVs 115. The zeroed LVM module 112 repeats this process for each of the zeroed LVs 115 it allocates.

In one embodiment, zeroed LVM module 112 divides the zeroed LV 115 into two sub-volumes: a data volume and a log volume. The data volume includes blocks having data. In some embodiments, the entire block includes data. In other embodiments, portion of the block includes data. The log volume includes a bit value assigned to each of the blocks in the data volume.

In one embodiment, the zeroed LVM module 112 reads the data stored in the zeroed LV 115. Specifically, the zeroed LVM module 112 reads the data in the block of the data volume if the corresponding value of the bit is set to 1 and ignores the data in the block of the data volume if the corresponding value of the bit is set to 0. The zeroed LVM module 112 repeats this read process for each of the zeroed LVs 115 it allocates.

In one embodiment, the zeroed LVM module 112 writes the data into the zeroed LV 115. Specifically, the zeroed LVM module 112 writes the data in the block of the data volume if the corresponding value of the bit is set to 1. If the corresponding value of the bit is set to 0, the zeroed LVM module 112 either overwrites the entire block, or erases the data in the entire block and then writes on the portion of the block. The zeroed LVM module 112 repeats this write process for each of the zeroed LVs 115 it allocates.

Figure 2:
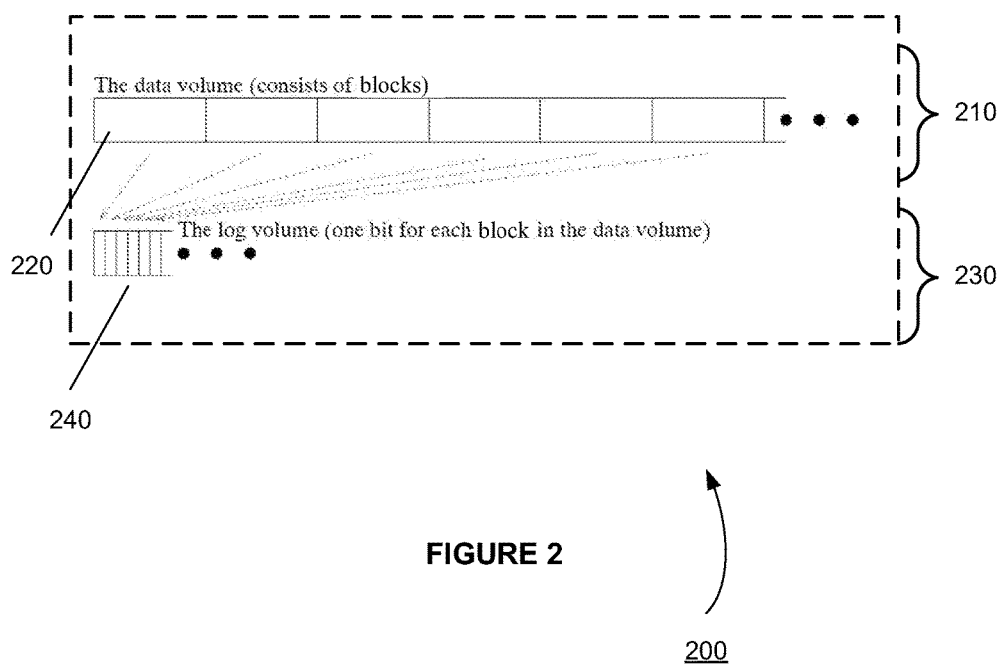
FIG. 2 is a block diagram of an exemplary zeroed LV according to an embodiment of the invention.

FIG. 2 is a block diagram of an exemplary zeroed LV 200 according to an embodiment of the invention. In one embodiment, the zeroed LV 200 is the same as any the zeroed LVs 115 of FIG. 1. The zeroed LV 200 consists of two sub-volumes, a data volume 210 and a log volume 230. The data volume 210 is divided into blocks 220. Each block 220 has a fixed number of sectors. For each block 220 in the data volume 210, a corresponding bit 240 is assigned in the log volume 230.

Blocks 220 of the data volume 210 are allocated from physical storage devices 130a-130n. As such, data volume 210 is considered to be un-initialized because it may have data written by a previous user of the physical storage devices 130a-130n prior to the allocation of the zeroed LV 115. To address the un-initialized data, embodiments of the invention initially assign all of the bits 240 a value of 0 upon allocation. Subsequently, a bit 240 is assigned a value of 1 if the data in the corresponding block 220 of the data volume 210 is initialized by an end user. Initialization occurs when the end user of the zeroed LV 200 writes into the block 220 of the data volume 210.

Figure 3:
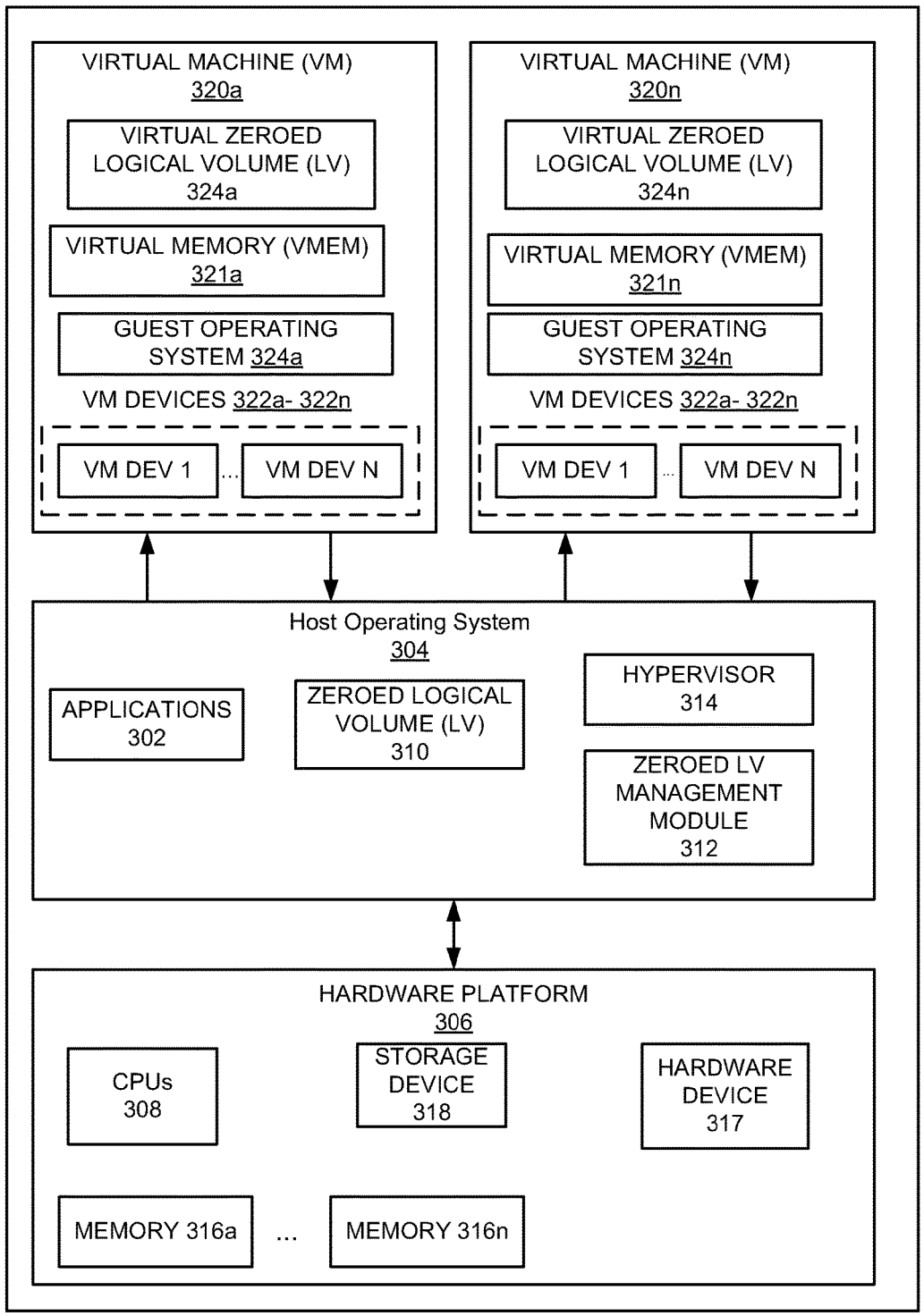
FIG. 3 is a block diagram of a computer system in which the embodiments of the present invention may operate.

FIG. 3 is a block diagram illustrating a computer system 300 in which embodiments of the present invention may be implemented. In one embodiment, the computer system 300 may be a host machine such as, for example, a server computer, a gateway computer, or any other suitable computer system that is configurable for operating as a host. The computer system 300 comprises a hardware platform 306, on top of which runs a host operating system (OS) 304. In one embodiment, the host OS 304 is executed by the host server 110 described with respect to FIG. 1. The host OS 304 may include Microsoft Windows®, Unix®, Linux®, Solaris®, Mac® OS or any other suitable operating system for managing operations on the computer system 300.

The hardware platform 306 may include one or more central processing units (CPUs) 108 and data storage 318. In one embodiment, the data storage 318 comprises one or more hardware and software devices, which may be located internally and externally to the computer system 300. Examples of data storage 318 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 317, such as network interface cards (NICs), sound or video adaptors, photo/video cameras, printer devices, keyboards, displays or any other suitable device intended to be coupled to a computer system.

The host OS 304 may include one or more software application programs 302 (i.e. applications). In one embodiment, the applications 302 executed by host OS 304 comprise multiple JAVA applications. In some embodiments, the multiple JAVA applications may be separate individual JAVA applications or multiple versions of the same JAVA applications, or a combination of both. The host OS 304 may also include one or more memories 316a-316n located internally to the computer system 300. Examples of data storage memories 316a-316n may include, but are not limited to, random-access memory (RAM), read-only memory (ROM), and cache memory.

In some embodiments, the host OS 304 includes a zeroed LVM module 312. In one embodiment, the zeroed LVM module 312 integrates with applications 302 to manage zeroed LV 310. In some embodiments, the zeroed LVM module 312 integrates with applications 302 to read data from the zeroed LV 310. In other embodiments, the zeroed LVM 312 integrates with applications to write data into the zeroed LV 310.

In some embodiments, virtualization is utilized to provide for zeroed LV. The host OS 304 may be configured with one or more virtual machines (VMs) 320a-320n. VMs 320a-320n are portions of software that when executed on appropriate hardware, create an environment that virtualizes a physical computer system. Each of the VMs 320a-320n includes a virtual memory (VMEM) 321a-321n, which is a virtualization of memory 316a-316n of host OS 304. Each of VMs 320a-320n may function as a self-contained platform, comprising one or more virtual devices 322a-322n and running a corresponding guest OS 324a-324n. The guest OS 324a-324n in each of the VMs 320a-320n may be the same or different OSs. Similar to the host OS 304, the guest OS 324a-324n may be Microsoft Windows®, Unix®, Linux®, Solaris®, Macintosh® OS, or any other suitable operating system for managing operations associated with a virtualization environment.

In one embodiment, a hypervisor 314, which emulates the underlying hardware platform 306 for VMs 320a-320n, is provided and may run on host OS 304 of the computer system 300. Hypervisor 314 may also be known as a virtual machine monitor (VMM), a kernel-based hypervisor, or a host operating system. Hypervisor 314 may support multiple VMs 320a-320n executing on the host OS 304 of computer system 300. Alternatively, more than one hypervisor (not shown) may be provided to support multiple VMs 320a-320n executing on the host OS 304.

In one embodiment, each of the VMs 320a-320n is assigned with a virtual zeroed LV 324a-324n which emulates the zeroed LV 310.

Figure 4:
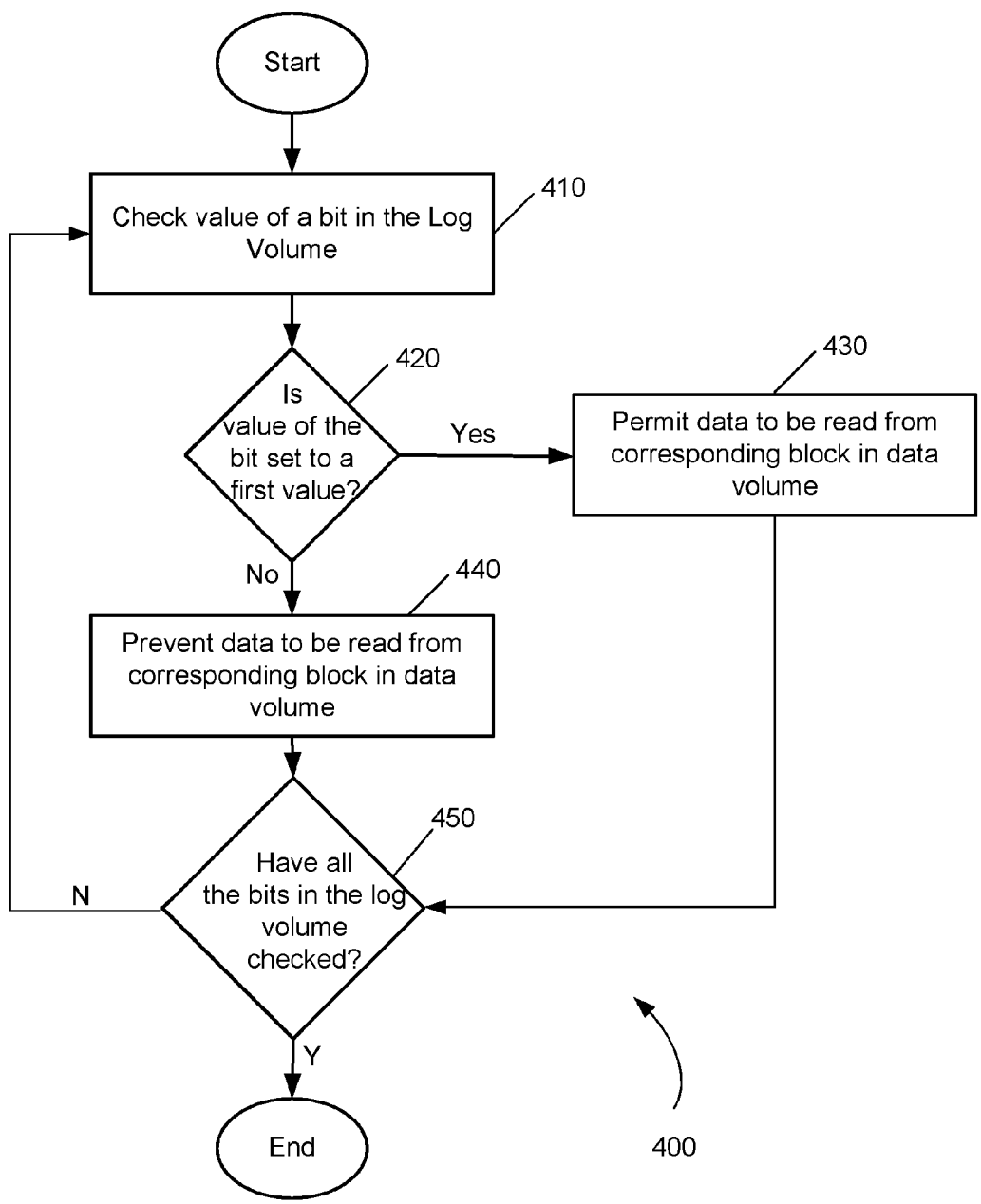
FIG. 4 is a flow diagram of one embodiment of a method for managing a zeroed LV.

FIG. 4 is a flow diagram illustrating a method 400 for managing zeroed LVs according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the zeroed LVM module 312 of FIG. 3.

Method 400 begins at block 410 where the value of the bit 240 in the log volume 230 is checked. At decision block 420, it is determined whether the value of the bit 240 is set to 1. If, at the decision block 420, it is determined that the value of the bit is set to 1, then data from the corresponding block 220 in the data volume 210 is permitted to be read at block 430. In one embodiment, the data in the corresponding block 220 is read by the end user. On the other hand, if, at the decision block 420, it is determined that the value of the bit 240 is not set to 1, then data from the corresponding block 220 in the data volume 210 is prevented from being read at block 440. In one embodiment, the end user is prevented from reading the data in the corresponding block 220.

At the decision block 450, it is determined whether all the bits 240 in the log volume 230 have been checked. If at the decision block 450, it is determined that all the bits 240 in the log volume 230 have not been checked, then method 400 returns to block 410 to continue to check the values of the rest of the bits 240 in the log volume 230. However, if at the decision block 450, it is determined that all the bits 240 in the log volume 230 have been checked, the method 400 ends.

Figure 5:
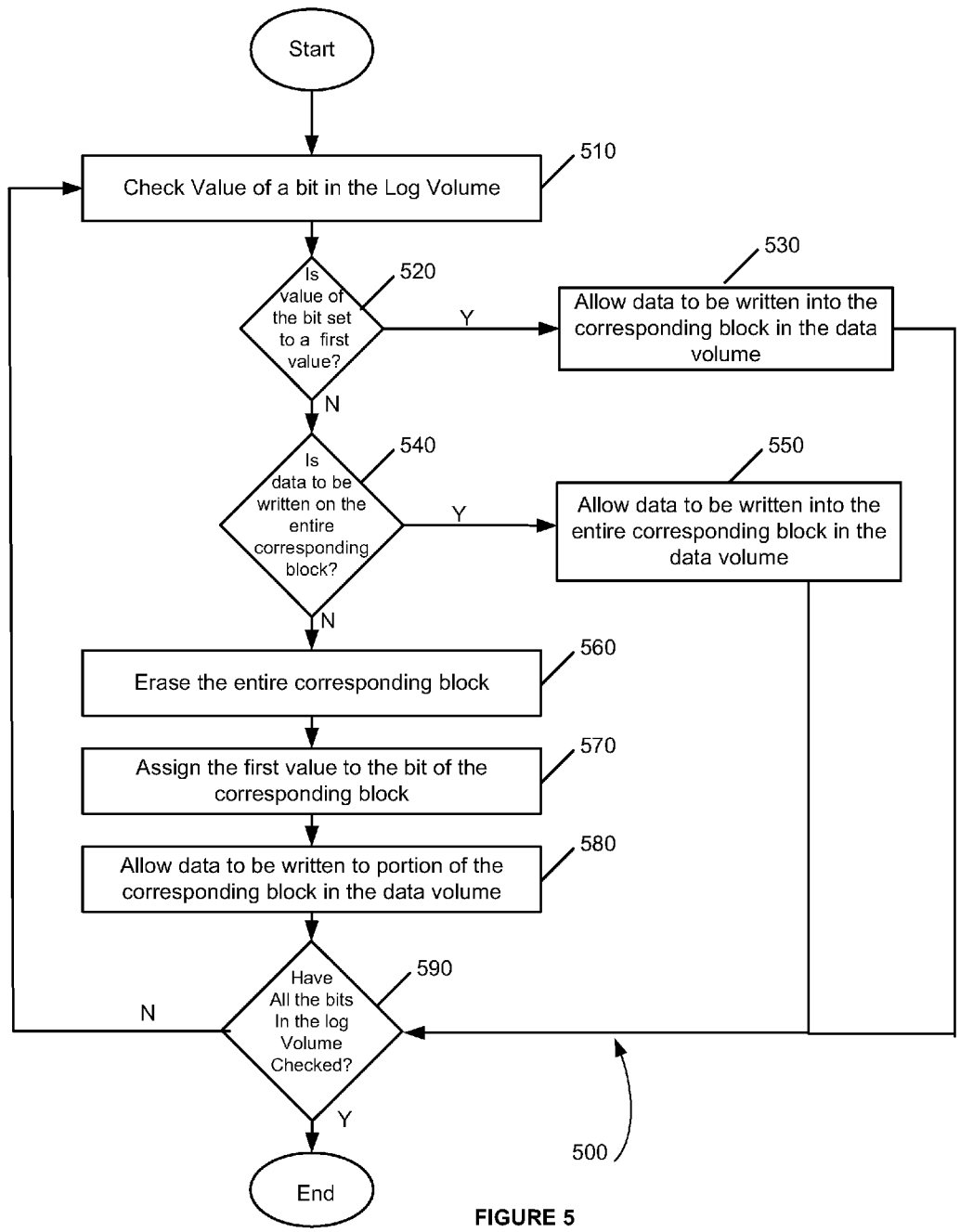
FIG. 5 is a flow diagram of another embodiment of a method for managing a zeroed LV.

FIG. 5 is a flow diagram illustrating a method 500 for managing zeroed LVs according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the zeroed LVM module 312 of FIG. 3.

Method 500 begins at block 510 where the value of the bit 240 in the log volume 230 is checked. At decision block 520, it is determined whether the value of the bit 240 is set to 1. If, at the decision block 520, it is determined that the value of the bit value is set to 1, then at block 530, data is allowed to be written into the corresponding block 220 in the data volume 210. On the other hand, if, at the decision block 520, it is determined that the value of the bit 240 is not set to 1, then at decision block 540 it is determined whether the data is to be written entirely on the corresponding block 220 or on a portion of the corresponding block 220.

If, at the decision block 540, it is determined that the data is to be written entirely on the corresponding block 220, then at block 550, the data is allowed to be written on the corresponding block 220. In one embodiment, the end user writes the data entirely on the corresponding block 220. This data overwrites any data previously written in the corresponding block 220 by a previous user.

On the other hand, if, at the decision block 540, it is determined that a portion of the corresponding block 220 is to be written, then at block 560, data on the corresponding block 220 is completely erased. At block 570, a value of 1 is assigned to the bit 240 of the corresponding block 220. At block 580, data is allowed to be written into the portion of the corresponding block 220. In one embodiment, the end user writes the data on the portion of the corresponding block 220.

At the decision block 590, it is determined whether all the bits 240 in the log volume 230 have been checked. If, at the decision block 590, it is determined that all the bits 240 in the log volume 230 have not been checked, then method 500 returns to block 510 to continue to check the rest of the values of the bits 240 in the log volume 230. However, if, at the decision block 590, it is determined that all the bits 240 in the log volume 230 have been checked, the method 500 ends.

Figure 6:
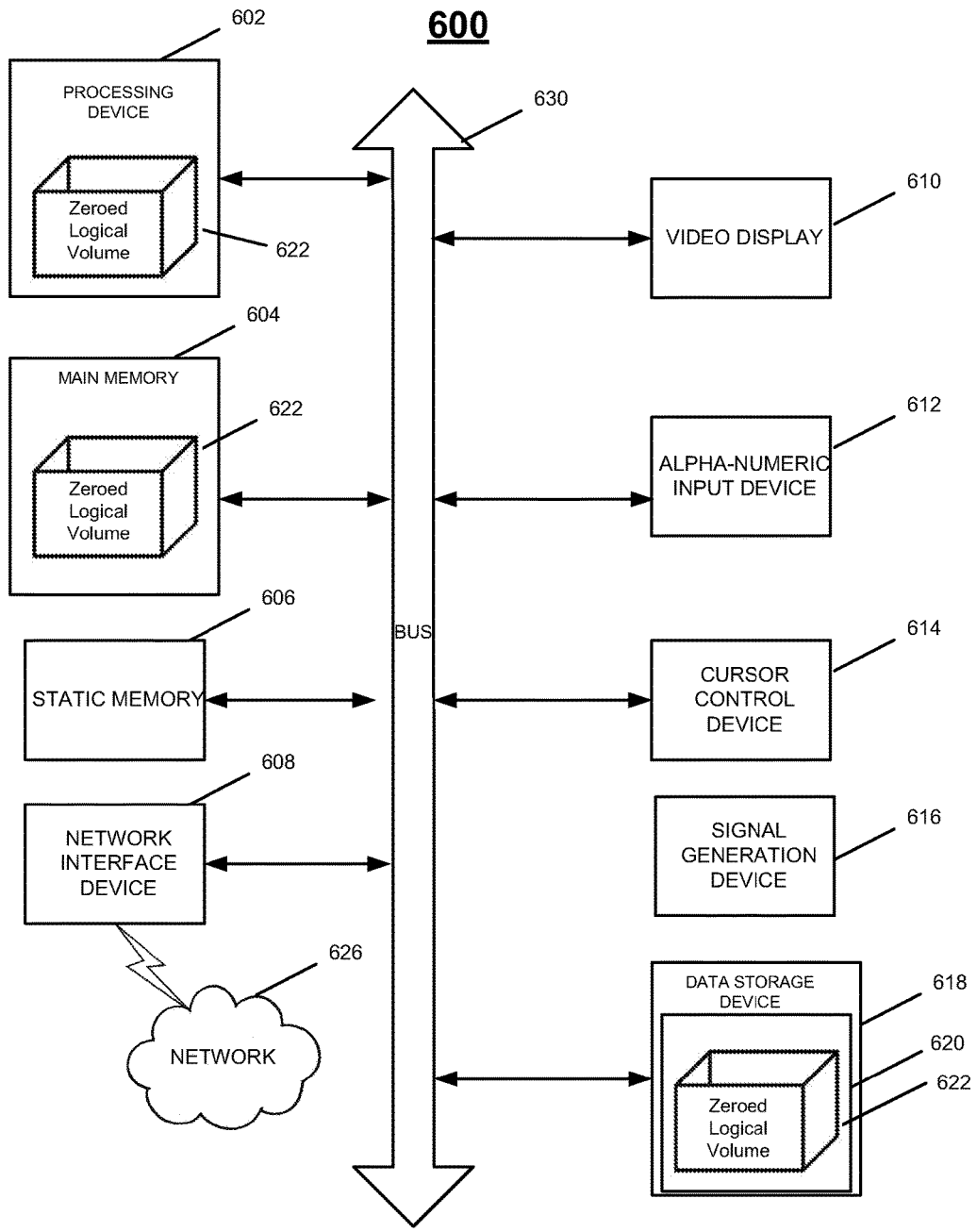
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute zeroed LV logic 622 for performing the operations and steps discussed herein. In one embodiment, zeroed LVM module 112 described with respect to FIG. 1 performs the zeroed LV logic 622.

The computer system 600 may further include a network interface device 408. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium (or more specifically a computer-readable storage medium) 620 on which is stored one or more sets of instructions (e.g. zeroed LV logic 622) embodying any one or more of the methodologies of functions described herein, such as methods 300 and 400 for providing zeroed LV described with respect to FIGS. 3 and 4, respectively. The zeroed LV logic 622 may also reside, completely or at least partially, within the memory 404 and/or within the processing device 602 during execution thereof by the computer system 600; the memory 604 and the processing device 602 also constituting machine-accessible storage media.

The machine-readable storage medium 620 may also be used to store the zeroed LV logic 622 persistently containing methods that call the above applications. While the machine-accessible storage medium 620 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:
1. A method, comprising:
   determining, by a processing device, whether a current data is to be written into an entirety of a storage block of a data volume of an operating system; and
   in response to determining that the current data is not to be written into the entirety of the storage block, deleting, by the processing device, all of previously written data on the storage block before writing the current data into the storage block, wherein the current data is different from the previously written data.

2. The method of claim 1 further comprising:
allowing the current data to be written into the entirety of the storage block.

3. The method of claim 1 further comprising:
in response to determining that the current data is not to be written into the entirety of the storage block, allowing the current data to be written into a portion of the storage block of the deleted data.

4. The method of claim 3 further comprising:
mapping a log volume to the data volume of the storage block.

5. The method of claim 4 further comprising:
assigning a bit value to the log volume.

6. The method of claim 5 further comprising:
allowing to read one of the current data or the previously written data in response to determining that the bit value assigned to the log volume is set to a first value.

7. The method of claim 5 further comprising;
preventing to read one of the current data or the previously written data in response to determining that the bit value assigned to the log volume is set to a second value.

8. A system comprising;
a memory;
a processing device, operatively coupled to the memory to:
  determine whether a current data is to be written into an entirety of a storage block of a data volume of an operating system; and
  in response to determining that the current data is not to be written into the entirety of the storage block, delete all of previously written data on the storage block before writing the current data into the storage block, wherein the current data is different from the previously written data.

9. The system of claim 8, wherein the processing device is to:
  allow the current data to be written into the entirety of the storage block.

10. The system of claim 8, wherein in response to determining that the current data is not to be written into the entirety of the storage block, the processing device is to allow the current data to be written into a portion of the storage block of the deleted data.

11. The system of claim 8, wherein the processing device is to:
  map a log volume to the data volume of the storage block.

12. The system of claim 11, wherein the processing device is to:
  assign a bit value to the log volume.

13. The system of claim 12 wherein the processing device is to:
  allow to read one of the current data or the previously written data in response to determining that the bit value assigned to the log volume is set to a first value.

14. The system of claim 12 wherein the processing device is to:
  prevent to read one of the current data or the previously written data in response to determining that the bit value assigned to the log volume is set to a first value.

15. A non-transitory machine-readable storage medium embodying instructions that, when accessed by a processing device, cause the processing device to:
  determine whether a current data is to be written into an entirety of a storage block of a data volume of an operating system; and
  in response to determining that the current data is not to be written into the entirety of the storage block, delete, by the processing device, all of previously written data on the storage block before writing the current data into the storage block, wherein the current data is different from the previously written data.

16. The non-transitory machine-readable storage medium of claim 15, wherein the processing device is to:
  allow the current data to be written into the entirety of the storage block.

17. The non-transitory machine-readable storage medium of claim 15, wherein in response to determining that the current data is not to be written into the entirety of the storage block, the processing device is to allow the current data to be written into a portion of the storage block of the deleted data.

18. The non-transitory machine-readable storage medium of claim 15, wherein the processing device is to:
  map a log volume to the data volume of the storage block, wherein a bit value is assigned to the log volume.

19. The non-transitory machine-readable storage medium of claim 18, wherein the processing device is to:
  allow to read one of the current data or the previously written data in response to determining that the bit value assigned to the log volume is set to a first value.

20. The non-transitory machine-readable storage medium of claim 18, wherein the processing device is to:
  prevent to read one of the current data or the previously written data in response to determining that the bit value assigned to the log volume is set to a first value.

* * * * *